United States Patent
Liao

(10) Patent No.: US 9,965,987 B2
(45) Date of Patent: May 8, 2018

(54) DISPLAY DEVICE AND METHOD FOR DRIVING THE SAME

(71) Applicant: SHENZHEN CHINA STAR OPTOELECTRONICS TECHNOLOGY CO., LTD., Shenzhen (CN)

(72) Inventor: Zuomin Liao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 120 days.

(21) Appl. No.: 14/416,367

(22) PCT Filed: Oct. 13, 2014

(86) PCT No.: PCT/CN2014/088467
§ 371 (c)(1),
(2) Date: May 5, 2016

(87) PCT Pub. No.: WO2016/033851
PCT Pub. Date: Mar. 10, 2016

(65) Prior Publication Data
US 2017/0110042 A1 Apr. 20, 2017

(30) Foreign Application Priority Data

Sep. 1, 2014 (CN) .......................... 2014 1 0440631

(51) Int. Cl.
*G09G 5/02* (2006.01)
*G09G 3/20* (2006.01)

(52) U.S. Cl.
CPC ......... *G09G 3/2003* (2013.01); *G09G 3/2092* (2013.01); *G09G 2300/0443* (2013.01)

(58) Field of Classification Search
CPC ...... G09G 3/2003; G09G 3/2092; G09G 3/20; G09G 2300/0443
See application file for complete search history.

(56) References Cited

U.S. PATENT DOCUMENTS

| 7,505,053 | B2* | 3/2009 | Brown Elliott ... G02F 1/133514 345/694 |
| 7,583,279 | B2* | 9/2009 | Brown Elliott ... G02F 1/133514 345/694 |

(Continued)

FOREIGN PATENT DOCUMENTS

| CN | 1722193 A | 1/2006 |
| JP | 11-295717 A | 10/1999 |

(Continued)

OTHER PUBLICATIONS

International Search Report (Forms PCT/ISA/210 and PCT/ISA/220) and the Written Opinion (Form PCT/ISA/237) dated May 22, 2015, by the State Intellectual Property Office of China acting as the International Searching Authority in corresponding International Application No. PCT/CN2014/088467. (11 pages).

*Primary Examiner* — Vijay Shankar
(74) *Attorney, Agent, or Firm* — Buchanan Ingersoll & Rooney PC

(57) ABSTRACT

A display device and a method for driving the display device are provided, which pertain to the technical field of display, and can reduce the negative influence of data lines in a RGBW display device on the light transmittance. The display device comprises a display panel having a plurality of pixel units arranged as an array. Each of the pixel units comprises three adjacent pixels located in the same column, and each of the pixels comprises a first color sub pixel, a second color sub pixel, a third color sub pixel, and a fourth color sub pixel. In each of the pixel units, the three fourth color sub pixels each share a corresponding data line with a (Continued)

first color sub pixel, a second color sub pixel and a third color sub pixel respectively of different pixels. The present disclosure can be applied to display devices, such as liquid crystal television, liquid crystal display device, mobile phone, and tablet PC, etc.

9 Claims, 4 Drawing Sheets

(56) References Cited

U.S. PATENT DOCUMENTS

| | | | |
|---|---|---|---|
| 9,224,323 B2* | 12/2015 | Xu | G09G 3/003 |
| 2005/0225574 A1 | 10/2005 | Credelle | |
| 2005/0225575 A1* | 10/2005 | Brown Elliott | G02F 1/133514 345/694 |
| 2008/0055525 A1 | 3/2008 | Igeta et al. | |
| 2014/0327710 A1* | 11/2014 | Xu | G09G 3/003 345/698 |

FOREIGN PATENT DOCUMENTS

| JP | 2001-296523 A | 10/2001 |
|---|---|---|
| JP | 2013-195919 A | 9/2013 |

* cited by examiner

DISPLAY DEVICE AND METHOD FOR DRIVING THE SAME

The present application claims benefit of Chinese patent application CN 201410440631.5, entitled "Display Device and Method for Driving the Same" and filed on Sep. 1, 2014, which is incorporated herein by reference.

TECHNICAL FIELD

The present disclosure relates to the technical field of display, and in particular to a display device and a method for driving the same.

TECHNICAL BACKGROUND

In a display device in the prior art, a pixel usually comprises three sub pixels of different colors, including red (R), green (G) and blue (B). The color and brightness presented by the pixel can be controlled by adjusting the respective gray scales of the three sub pixels. Thus, the above display device can also be called a RGB display device.

However, each of the sub pixels of the RGB display device can filter the white light emitted by the backlight thereof, rendering the transmittance of the light emitted by the backlight of the existing RGB display device relatively low. In order to ensure the brightness of the RGB display device, it is necessary to improve the luminous efficiency of the backlight, which causes relatively large power consumption and high cost to use of the RGB display device.

In order to decrease the power consumption of the display device, a RGBW display device emerges. The RGBW display device comprises sub pixels of four colors, namely red (R), green (G), blue (B), and white (W). Because a white pixel would not filter the light, the transmittance of the light emitted by the backlight of the display device can be improved, thereby the power consumption of the display device can be reduced.

However, it is found that in the prior art, each sub pixel needs to be driven by a separate data line. A data line is usually made by non-transparent conductive metal, which would negatively influence the light transmittance of the display device.

SUMMARY OF THE INVENTION

The objective of the present disclosure is to provide a display device and a method for driving the display device, which can reduce the negative influence of data lines in a RGBW display device on the light transmittance thereof.

The present disclosure provides a display device, comprising a display panel having a plurality of pixel units arranged as an array, each of the pixel units comprising three adjacent pixels located in the same column, and each of the pixels comprising a first color sub pixel, a second color sub pixel, a third color sub pixel, and a fourth color sub pixel, wherein in each of the pixel units, the three fourth color sub pixels each share a corresponding data line with a first color sub pixel, a second color sub pixel and a third color sub pixel respectively of different pixels.

In each of the pixel units, the first color sub pixel, the second color sub pixel and the third color sub pixel of each pixel are arranged in parallel, and the fourth color sub pixel of each pixel is divided by data lines into three horizontally arranged fourth color sub pixel blocks, which are disposed above or under the first color sub pixel, the second color sub pixel and the third color sub pixel respectively, and are connected with each other through pixel electrodes thereof.

For each pixel in each pixel unit, the first color sub pixel, the second color sub pixel, the third color sub pixel and the fourth color sub pixel are arranged from left to right in sequence.

In each pixel unit, the first color sub pixel, the second color sub pixel and the third color sub pixel are arranged from left to right in sequence, and the fourth color sub pixels are respectively located between the first color sub pixel and the second color sub pixel of a first pixel, between the second color sub pixel and the third color sub pixel of a second pixel, and between the third color sub pixel of a third pixel and a horizontally adjacent pixel unit.

In each of the pixel units, the fourth color sub pixel of the first pixel and the first color sub pixel thereof share a data line, the fourth color sub pixel of the second pixel and the second color sub pixel thereof share a data line, and the fourth color sub pixel of the third pixel and the third color sub pixel thereof share a data line.

The first color sub pixel is a red sub pixel, the second color sub pixel is a green sub pixel, the third color sub pixel is a blue sub pixel, and the fourth color sub pixel is a white or transparent sub pixel.

Four gate lines are arranged in each pixel unit from top to bottom, wherein a first gate line is used for driving thin film transistors of the first color sub pixel, the second color sub pixel, and the third color sub pixel of the first pixel, a second gate line is used for driving a thin film transistor of the fourth color sub pixel of the first pixel and those of the second color sub pixel and the third color sub pixel of the second pixel, a third gate line is used for driving the thin film transistors of the first color sub pixel and the fourth color sub pixel of the second pixel and that of the third color sub pixel of the third pixel, and a fourth gate line is used for driving thin film transistors of the first color sub pixel, second color sub pixel and the fourth color sub pixel of the third pixel.

The present disclosure has the following beneficial effects. In the technical solution according to the embodiments of the present disclosure, a display device is provided, comprising a display panel having a plurality of pixel units arranged as an array. Each pixel unit comprises three adjacent pixels located in the same column, and each pixel comprises four sub pixels which use three data lines. As compared with the solution in the prior art that each sub pixel corresponds to one data line, the number of data lines in the present disclosure is reduced, and thus the light transmittance of the display device can be improved, thereby the negative influence of data lines in the RGBW display device on the light transmittance can be reduced.

According to a second aspect of the present disclosure, a method for driving a display device is provided, comprising:

at a first moment, inputting through a first gate line a drive signal for enabling thin film transistors of a first color sub pixel, a second color sub pixel and a third color sub pixel of a first pixel, at a second moment, inputting through a second gate line a drive signal for enabling a thin film transistor of a fourth color sub pixel of the first pixel and those of a second color sub pixel and a third color sub pixel of a second pixel, at a third moment, inputting through a third gate line a drive signal for enabling the thin film transistors of a first color sub pixel and a fourth color sub pixel of the second pixel and that of a third color sub pixel of a third pixel, and at a fourth moment, inputting through a fourth gate line a drive signal for enabling the thin film transistors of a first color sub pixel, a second color sub pixel and a fourth color sub pixel of the third pixel.

The first color sub pixel is a red sub pixel, the second color sub pixel is a green sub pixel, the third color sub pixel is a blue sub pixel, and the fourth color sub pixel is a white or transparent sub pixel.

The drive signal is a high level pulse signal.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

In order to clarify the technical solutions of the embodiments of the present disclosure, the drawings relating to the embodiments will be explained briefly. In which.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

Example 1

Figure 1:
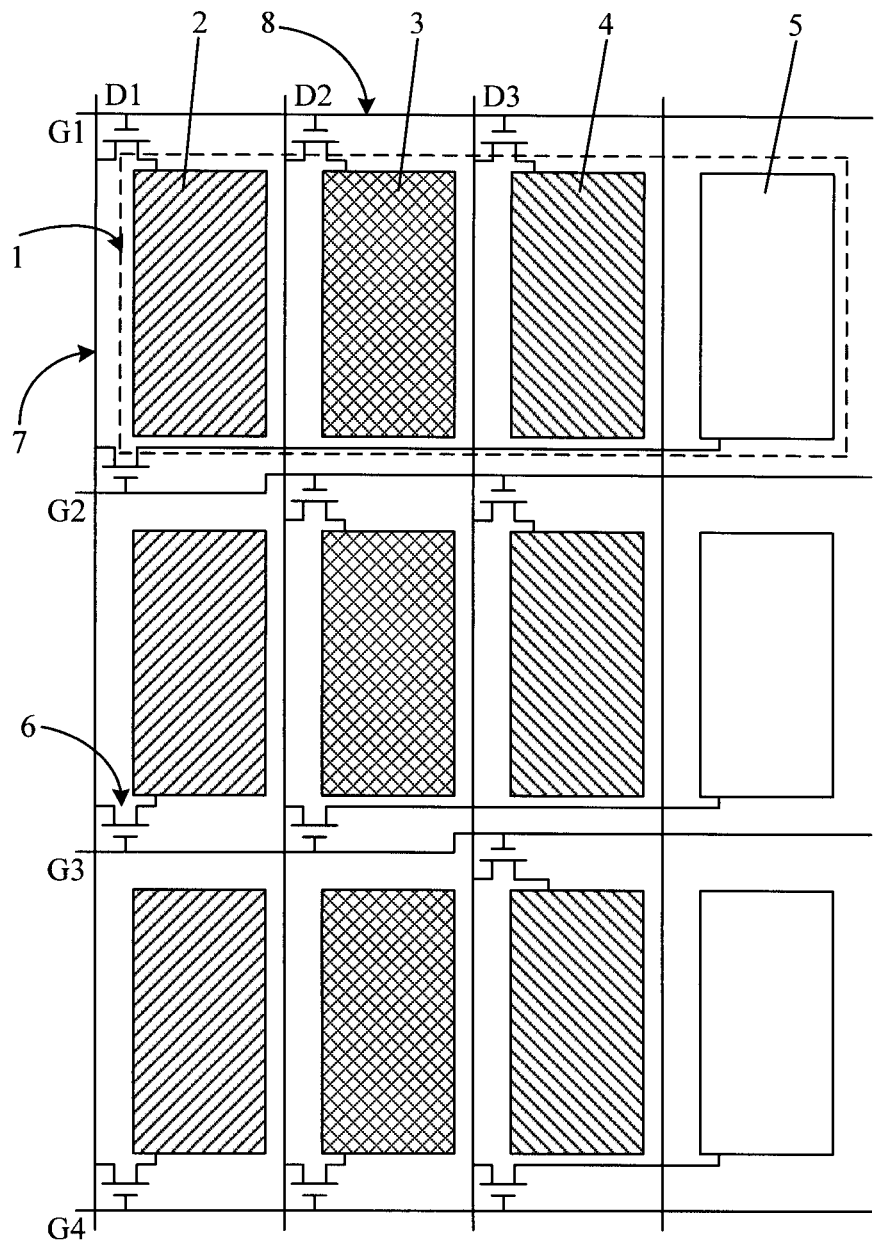
FIG. 1 schematically shows a first structure of a display device according to example 1 of the present disclosure, FIG. 2 schematically shows a second structure of the display device according to example 1 of the present disclosure, FIG. 3 schematically shows a third structure of the display device according to example 1 of the present disclosure.

The example according to the present disclosure provides a display device, comprising a display panel. The display panel comprises a plurality of pixel units arranged as an array, as shown in FIG. 1. Each pixel unit comprises three adjacent pixels 1 located in the same column. Each pixel 1 comprises a first color sub pixel 2, a second color sub pixel 3, a third color sub pixel 4, and a fourth color sub pixel 5.

In each of pixel units, the three fourth color sub pixels each share a corresponding data line 7 with the first color sub pixel 2, the second color sub pixel 3 and the third color sub pixel 4 respectively of different pixels 1.

It should be noted that as shown in FIG. 1, two sub pixels sharing a data line 7 means that the sources/drains of the thin film transistors (TFTs) 6 of the two sub pixels are connected to the same data line 7, i.e., a gray scale signal is inputted through the same data line 7, so as to display corresponding gray scales.

In the technical solution according to the example of the present disclosure, a display device is provided, comprising a display panel having a plurality of pixel units arranged as an array. Each pixel unit comprises three adjacent pixels located in the same column, and each pixel comprises four sub pixels, which use three data lines altogether. As compared with the solution in the prior art that each sub pixel corresponds to one data line, the number of data lines in the present disclosure is reduced, and thus the light transmittance of the display device can be improved, thereby the negative influence of data lines in the RGBW display device on the light transmittance can be reduced.

In an embodiment of the present disclosure, as shown in FIG. 1, in each of the pixel units, each pixel 1 comprises a first color sub pixel 2, a second color sub pixel 3, a third color sub pixel 4 and a fourth color sub pixel 5 arranged from left to right in sequence.

As shown in FIG. 1, in each of the pixel units, the fourth color sub pixel 5 of a first pixel 1 and the first color sub pixel 2 thereof share a data line 7, the fourth color sub pixel 5 of a second pixel 1 and the second color sub pixel 3 thereof share a data line 7, and the fourth color sub pixel 5 of a third pixel 1 and the third color sub pixel 4 thereof share a data line 7.

Figure 2:
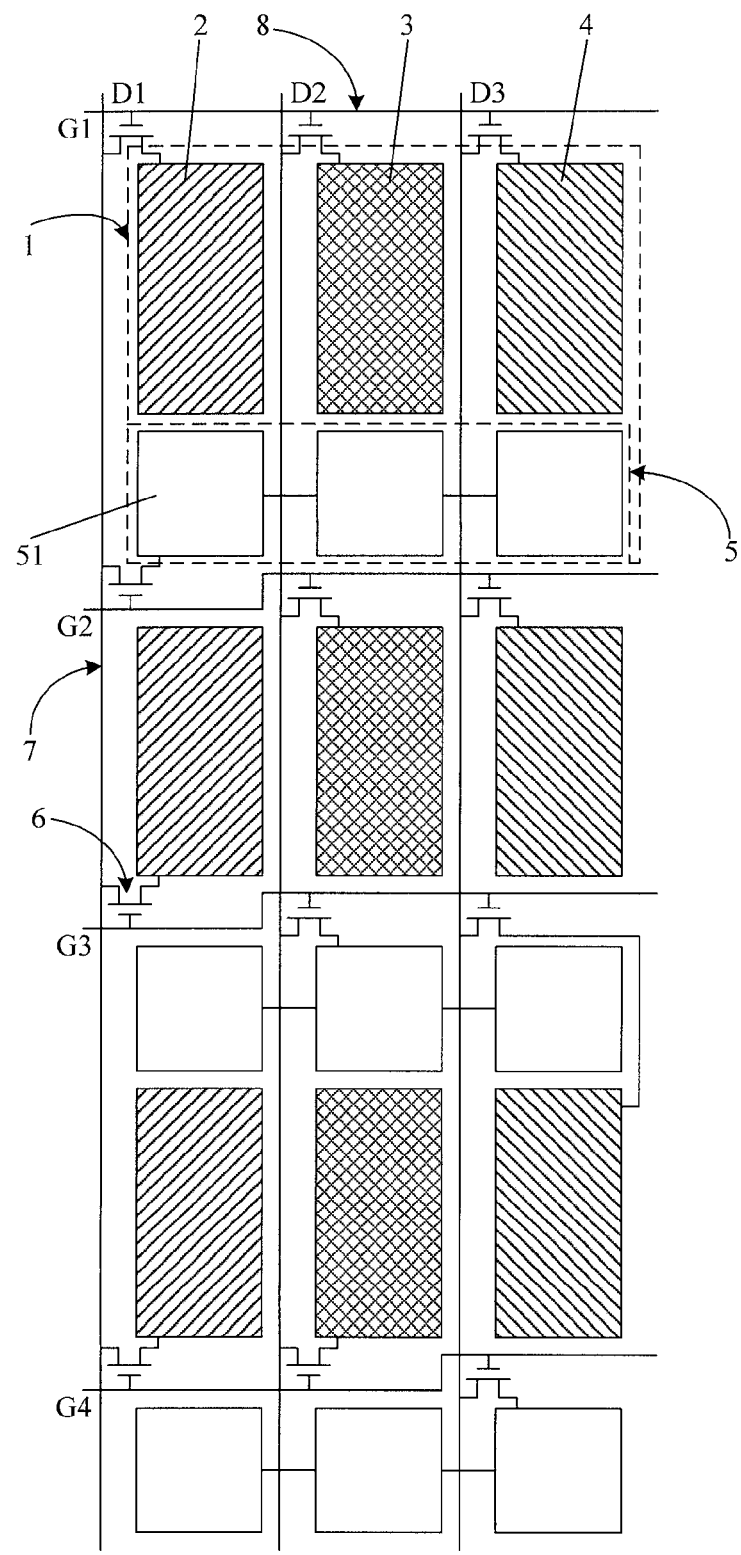

Further, in another embodiment according to the present disclosure, as shown in FIG. 2, in each of the pixel units, the first color sub pixel 2, the second color sub pixel 3 and the third color sub pixel 4 of each pixel 1 are arranged in parallel, while the fourth color sub pixel 5 of each pixel 1 is divided by data lines 7 into three fourth color sub pixel blocks 51. The fourth color sub pixel blocks 51 are disposed under the first color sub pixel 2, second color sub pixel 3 and the third color sub pixel 4 respectively, and are connected with each other through pixel electrodes thereof.

As shown in FIG. 2, although the fourth color sub pixel 5 is divided by data lines 7 into three fourth color sub pixel blocks 51 arranged horizontally, the three fourth color sub pixel blocks 51 can be driven simultaneously by connecting the pixel electrodes thereof with one another. Because the pixel electrodes of the three fourth color sub pixel blocks 51 are usually made from transparent metal oxide, such as indium tin oxide (ITO), indium zinc oxide (IZO), and indium gallium zinc oxide (IGZO), etc., the light transmittance of the display device would not be influenced by the wires between the pixel electrodes of the three fourth color sub pixel blocks 51.

As shown in FIG. 2, in each of the pixel units, the fourth color sub pixel 5 of the first pixel 1 and the first color sub pixel 2 thereof share a data line 7, the fourth color sub pixel 5 of the second pixel 1 and the second color sub pixel 3 thereof share a data line 7, and the fourth color sub pixel 5 of the third pixel 1 and the third color sub pixel 4 share a data line 7.

It should be noted that although the three fourth color sub pixel blocks 51 in FIG. 2 are respectively located under the first color sub pixel 2, the second color sub pixel 3 and the third color sub pixel 4, it is obvious that the three fourth color sub pixel blocks 51 can also be located respectively above the first color sub pixel 2, the second color sub pixel 3 and the third color sub pixel 4. The location of the three fourth color sub pixel blocks is not limited to the embodiments of the present disclosure.

Figure 3:
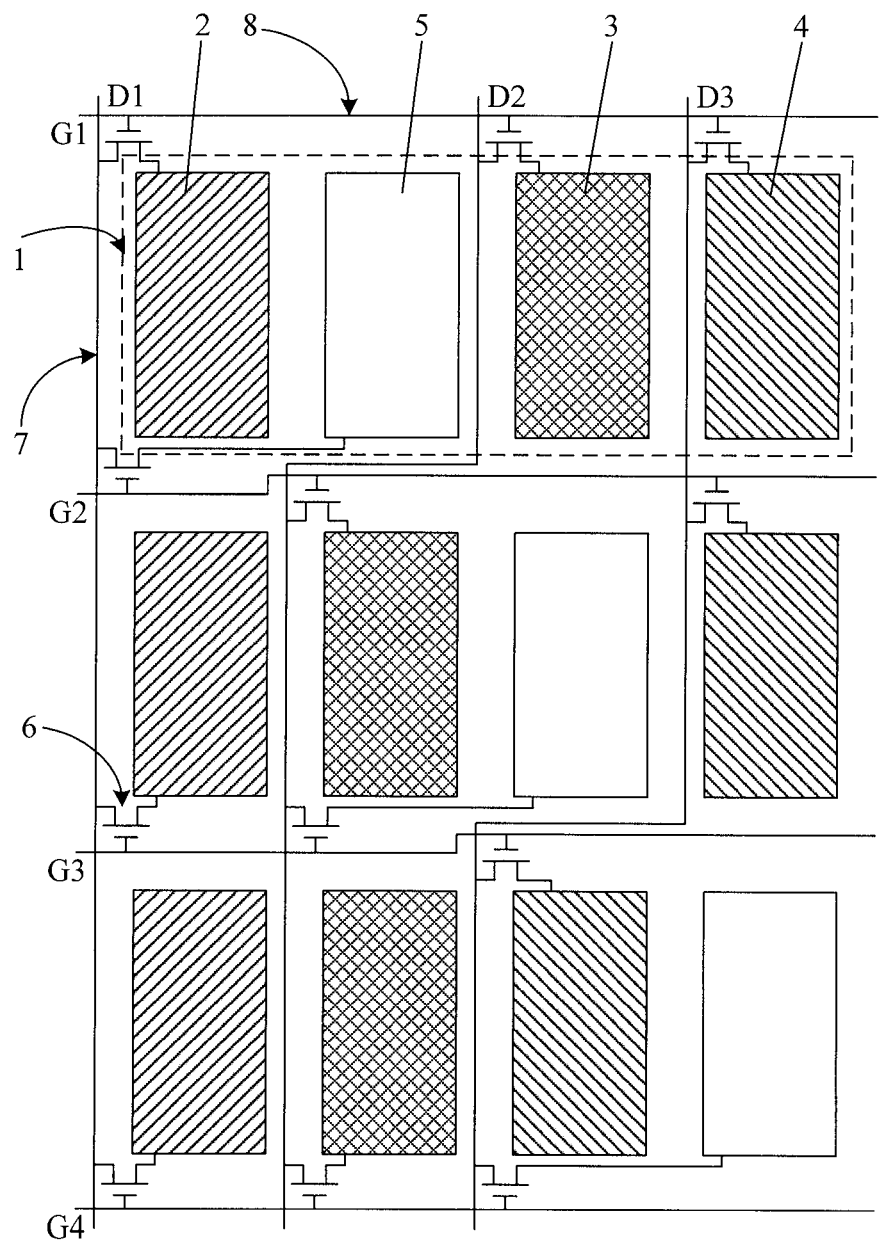

Further, in a third embodiment according to the present disclosure, as shown in FIG. 3, in each pixel unit, the first color sub pixel 2, the second color sub pixel 3 and the third color sub pixel 4 of each pixel are arranged from left to right in sequence. The fourth color sub pixels 5 are respectively located between the first color sub pixel 2 and the second color sub pixel 3 of the first pixel 1, between the second color sub pixel 3 and the third color sub pixel 4 of the second pixel 1, and between the third color sub pixel 4 of the third pixel 1 and a horizontally adjacent pixel unit. As shown in FIG. 3, the fourth color sub pixel 5 of the third pixel 1 is located at the right-most side of the third pixel 1.

Correspondingly, in each pixel unit, the fourth color sub pixel 5 of the first pixel 1 and the first color sub pixel 2 thereof share a data line 7, the fourth color sub pixel 5 of the second pixel 1 and the second color sub pixel 3 thereof share a data line 7, and the fourth color sub pixel 5 of the third pixel 1 and the third color sub pixel 4 thereof share a data line 7.

It should be noted that in the above three embodiments, the first color sub pixel 2 can be a red sub pixel, the second color sub pixel 3 can be a green sub pixel, the third color sub pixel 4 can be a blue sub pixel, and the fourth color sub pixel 5 can be a white or transparent sub pixel. Certainly, the colors of the first color sub pixel 2 to the fourth color sub pixel 5 can also be adjusted according to actual requirements, and thus are not limited to those in the present disclosure.

Obviously, the arrangements of the first color sub pixel 2 to the fourth color sub pixel 5 are not limited to those in the abovementioned three embodiments, and thus the examples of the present disclosure does not set limitations thereto.

Further, according to FIGS. 1 to 3, four gate lines 8 are arranged in each pixel unit from top to bottom, wherein a first gate line G1 is used for driving thin film transistors 6 of the first color sub pixel 2, second color sub pixel 3, and the third color sub pixel 4 of the first pixel 1, a second gate line G2 is used for driving a thin film transistor 6 of the fourth color sub pixel 5 of the first pixel 1 and those of the second color sub pixel 3 and the third color sub pixel 4 of the second pixel 1, a third gate line G3 is used for driving the thin film transistors 6 of the first color sub pixel 2 and the fourth color sub pixel 5 of the second pixel 1 and that of the third color sub pixel 4 of the third pixel 1, and a fourth gate line G4 is used for driving thin film transistors 6 of the first color sub pixel 2, second color sub pixel 3 and the fourth color sub pixel 5 of the third pixel 1.

Thus, it can be guaranteed that gray scale signals are inputted into the four sub pixels through three data lines 7 by adjusting the time sequence of the input signals on the data lines 7 in combination with the drive of the gate lines 8, and thus the four sub pixels can respectively display the corresponding gray levels, thereby normal display of the display device can be ensured.

For example, in FIG. 1 or FIG. 2 or FIG. 3, at a first moment, a drive signal is inputted through a first gate line G1 for enabling thin film transistors 6 of the first color sub pixel 2, the second color sub pixel 3 and the third color sub pixel 4 of the first pixel 1. At this moment, gray signals are respectively inputted through data lines D1, D2 and D3 into the first color sub pixel 2, the second color sub pixel 3, and the third color sub pixel 4 of the first pixel 1, so as to drive the three sub pixels to display corresponding gray scales. At a second moment, a drive signal is inputted through a second gate line G2 for enabling a thin film transistor 6 of the fourth color sub pixel 5 of the first pixel 1 and those of the second color sub pixel 3 and the third color sub pixel 4 of the second pixel 1. At this moment, gray scale signals are respectively inputted through data lines D1, D2, and D3 into the fourth color sub pixel 5 of the first pixel 1, and the second color sub pixel 3 and the third color sub pixel 4 of the second pixel 1, so as to drive the three sub pixels to display corresponding gray scales. At a third moment, a drive signal is inputted through a third gate line G3 for enabling thin film transistors 6 of the first color sub pixel 2 and the fourth color sub pixel 5 of the second pixel 1 and that of the third color sub pixel 4 of the third pixel 1. At this moment, gray scale signals are respectively inputted through data lines D1, D2 and D3 into the first color sub pixel 2 and the fourth color sub pixel 5 of the second pixel 1 and the third color sub pixel 4 of the third pixel 1, so as to drive the three sub pixels to display corresponding gray scales. At the fourth moment, a drive signal is inputted through a fourth gate line G4 for enabling thin film transistors 6 of the first color sub pixel 2, the second color sub pixel 3 and the fourth color sub pixel 5 of the third pixel 1. At this moment, gray scale signals are respectively inputted through data lines D1, D2, and D3 into the first color sub pixel 2, the second color sub pixel 3 and the fourth color sub pixel 5 of the third pixel 1, so as to drive the three sub pixels to display corresponding gray scales.

Example 2

Figure 4:
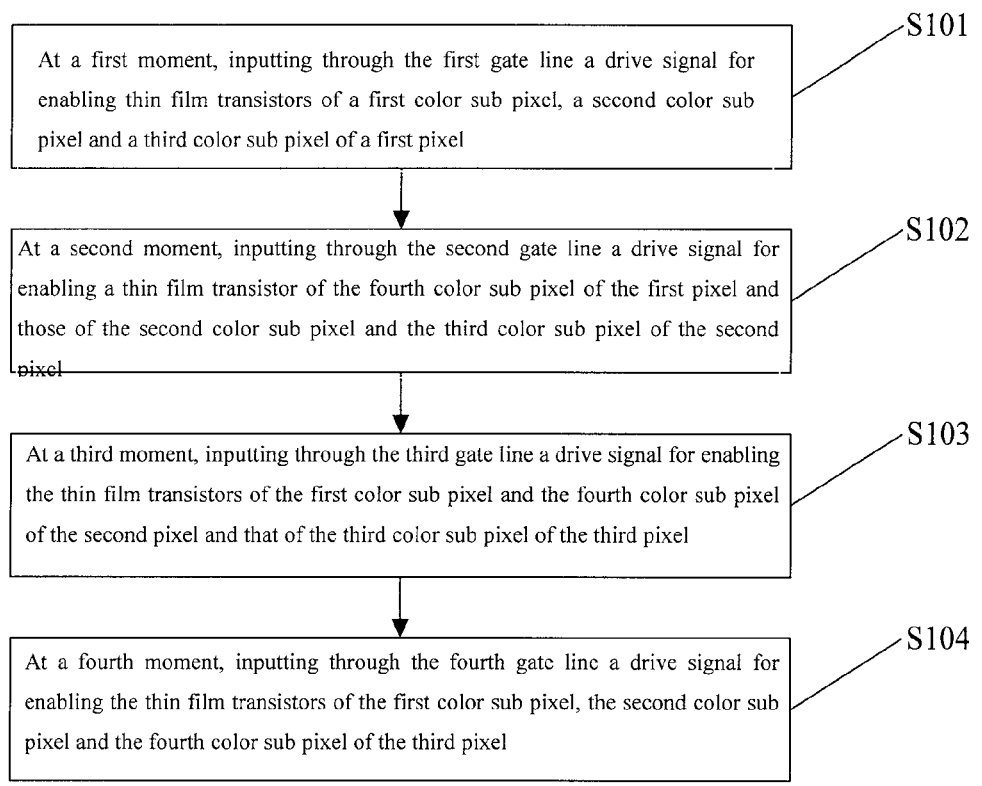
FIG. 4 is a schematic flow chart of a method for driving a display device according example 2 of the present disclosure.

The present disclosure provides a method for driving the display device according to example 1 of the present disclosure. Specifically, as shown in FIG. 4, the method comprises the following steps.

Step S101: at the first moment, a drive signal is inputted through a first gate line for enabling thin film transistors of a first color sub pixel, a second color sub pixel and a third color sub pixel of a first pixel, Correspondingly, at the first moment, gray scale signals are respectively inputted through three data lines into the first color sub pixel, the second color sub pixel and the third color sub pixel of the first pixel, so as to drive the sub pixels to display corresponding gray scales.

Step S102: at the second moment, a drive signal is inputted through a second gate line for enabling a thin film transistor of the fourth color sub pixel of the first pixel and those of the second color sub pixel and the third color sub pixel of the second pixel.

Correspondingly, at the second moment, gray scale signals are respectively inputted through three data lines into the fourth color sub pixel of the first pixel, and the second color sub pixel and the third color sub pixel of the second pixel, so as to drive the three sub pixels to display corresponding gray scales.

Step S103: at the third moment, a drive signal is inputted through a third gate line for enabling thin film transistors of the first color sub pixel and the fourth color sub pixel of the second pixel and that of the third color sub pixel of the third pixel.

Correspondingly, at the third moment, gray scale signals are respectively inputted through three data lines into the first color sub pixel and the fourth color sub pixel of the second pixel and the third color sub pixel of the third pixel, so as to drive the three sub pixels to display corresponding gray scales.

Step S104: at the fourth moment, a drive signal is inputted through a fourth gate line for enabling thin film transistors of the first color sub pixel, the second color sub pixel and the fourth color sub pixel of the third pixel.

Correspondingly, at the fourth moment, gray scale signals are respectively inputted through three data lines into the first color sub pixel, the second color sub pixel and the fourth color sub pixel of the third pixel, so as to drive the three sub pixels to display corresponding gray scales.

The above four steps are conducted on each pixel unit repeatedly until the last pixel unit on the display panel, so that the display of an image on the display panel is completed.

In an example of the present disclosure, the first color sub pixel can be a red sub pixel, the second color sub pixel can be a green sub pixel, the third color sub pixel can be a blue sub pixel, and the fourth color sub pixel can be a white or transparent sub pixel. Certainly, the colors of the first color sub pixel 2 to the fourth color sub pixel 5 can also be adjusted according to actual requirements, and thus are not limited to those in the present disclosure.

Usually, the drive signal is high level pulse signal.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

LIST OF REFERENCE SIGNS

1: pixel
2: first color sub pixel
3: second color sub pixel
4: third color sub pixel
5: fourth color sub pixel
51: fourth color sub pixel block
6: thin film transistor
7: data line
8: gate line

The invention claimed is:

1. A display device, comprising a display panel having a plurality of pixel units arranged as an array, each of the pixel units comprising three adjacent pixels located in the same column, and each of the pixels comprising a first color sub pixel, a second color sub pixel, a third color sub pixel, and a fourth color sub pixel, wherein in each of the pixel units, the three fourth color sub pixels each share a corresponding data line with a first color sub pixel, a second color sub pixel and a third color sub pixel respectively of different pixels;
   wherein four gate lines are arranged in each pixel unit from top to bottom, wherein a first gate line is used for driving thin film transistors of the first color sub pixel, the second color sub pixel, and the third color sub pixel of a first pixel, a second gate line is used for driving a thin film transistor of the fourth color sub pixel of the first pixel and those of the second color sub pixel and the third color sub pixel of a second pixel, a third gate line is used for driving the thin film transistors of the first color sub pixel and the fourth color sub pixel of the second pixel and that of the third color sub pixel of a third pixel, and a fourth gate line is used for driving thin film transistors of the first color sub pixel, second color sub pixel and the fourth color sub pixel of the third pixel.

2. The display device according to claim 1, wherein in each of the pixel units, the first color sub pixel, the second color sub pixel and the third color sub pixel of each pixel are arranged in parallel, and the fourth color sub pixel of each pixel is divided by data lines into three horizontally arranged fourth color sub pixel blocks, which are disposed above or under the first color sub pixel, the second color sub pixel and the third color sub pixel respectively, and are connected with each other through pixel electrodes thereof.

3. The device according to claim 1, wherein
for each pixel in each pixel unit, the first color sub pixel, the second color sub pixel, the third color sub pixel and the fourth color sub pixel are arranged from left to right in sequence.

4. The device according to claim 1, wherein in each pixel unit,
the first color sub pixel, the second color sub pixel and the third color sub pixel of each pixel are arranged from left to right in sequence, and
the fourth color sub pixels are respectively located between the first color sub pixel and the second color sub pixel of a first pixel, between the second color sub pixel and the third color sub pixel of a second pixel, and between the third color sub pixel of a third pixel and a horizontally adjacent pixel unit.

5. The display device according to claim 1, wherein
in each of the pixel units, the fourth color sub pixel of the first pixel and the first color sub pixel thereof share a data line, the fourth color sub pixel of the second pixel and the second color sub pixel thereof share a data line, and the fourth color sub pixel of the third pixel and the third color sub pixel thereof share a data line.

6. The display device according to claim 5, wherein
the first color sub pixel is a red sub pixel, the second color sub pixel is a green sub pixel, the third color sub pixel is a blue sub pixel, and the fourth color sub pixel is a white or transparent sub pixel.

7. A method for driving a display device, wherein the method comprises:
at a first moment, inputting through a first gate line a drive signal for enabling thin film transistors of a first color sub pixel, a second color sub pixel and a third color sub pixel of a first pixel,
at a second moment, inputting through a second gate line a drive signal for enabling a thin film transistor of a fourth color sub pixel of the first pixel and those of a second color sub pixel and a third color sub pixel of a second pixel,
at a third moment, inputting through a third gate line a drive signal for enabling the thin film transistors of a first color sub pixel and a fourth color sub pixel of the second pixel and that of a third color sub pixel of a third pixel, and
at a fourth moment, inputting through a fourth gate line a drive signal for enabling the thin film transistors of a first color sub pixel, a second color sub pixel and a fourth color sub pixel of the third pixel.

8. The method according to claim 7, wherein
the first color sub pixel is a red sub pixel, the second color sub pixel is a green sub pixel, the third color sub pixel is a blue sub pixel, and the fourth color sub pixel is a white or transparent sub pixel.

9. The method according to claim 7, wherein
the drive signal is a high level pulse signal.

* * * * *